United States Patent [19]
Kane et al.

[11] Patent Number: 5,768,786
[45] Date of Patent: Jun. 23, 1998

[54] HAND-HELD MOTOR OR ENGINE POWERED RIGID BLADE BRUSH CUTTING DEVICE HAVING FAIL-SAFE DESIGN

[76] Inventors: Steven F. Kane, 460 Peters Blvd., Brightwaters, N.Y. 11718; William Marletta, 143 Cedar Point Dr., West Islip, N.Y. 11795

[21] Appl. No.: 813,991

[22] Filed: Mar. 10, 1997

[51] Int. Cl.⁶ .................................................. B26B 7/00
[52] U.S. Cl. .......................... 30/276; 30/391; 188/77 W
[58] Field of Search ............................ 30/296, 390, 391; 188/77 W

[56] References Cited

U.S. PATENT DOCUMENTS

| | | | |
|---|---|---|---|
| 1,816,966 | 8/1931 | Gray et al. | 30/390 |
| 4,006,528 | 2/1977 | Katsuya | 30/276 |
| 5,012,582 | 5/1991 | Bristol et al. | 30/391 |
| 5,480,009 | 1/1996 | Wieland et al. | 188/77 W |
| 5,636,444 | 6/1997 | Nickel | 30/276 |

FOREIGN PATENT DOCUMENTS 966065  8/1964  United Kingdom.

*Primary Examiner*—Hwei-Siu Payer
*Attorney, Agent, or Firm*—Mark Montague, Esq.

[57] ABSTRACT

A pole-mounted, hand-held brush or vegetation trimmer is provided with a self-actuating braking device, and a fixed guard or a fail-safe articulating guard for selectively fully enclosing the rotating blade to prevent injury to the user.

19 Claims, 7 Drawing Sheets

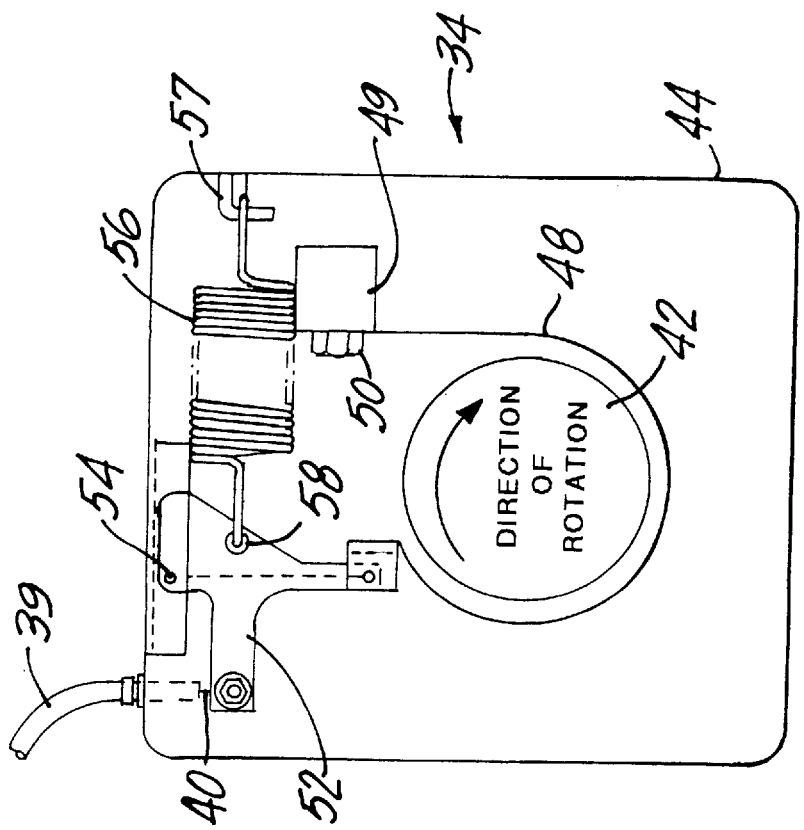
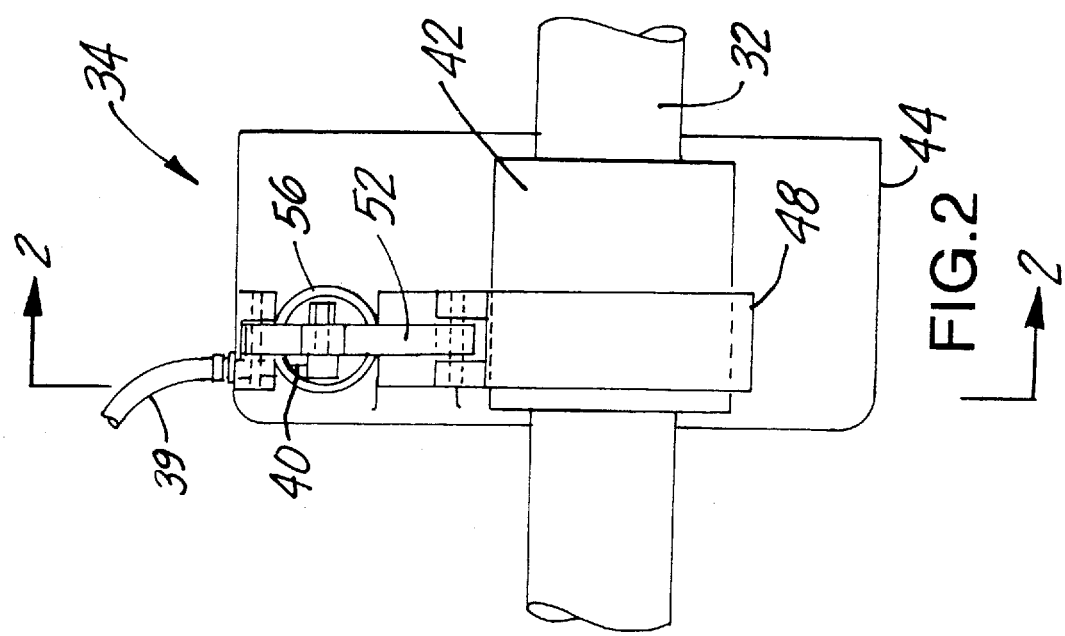

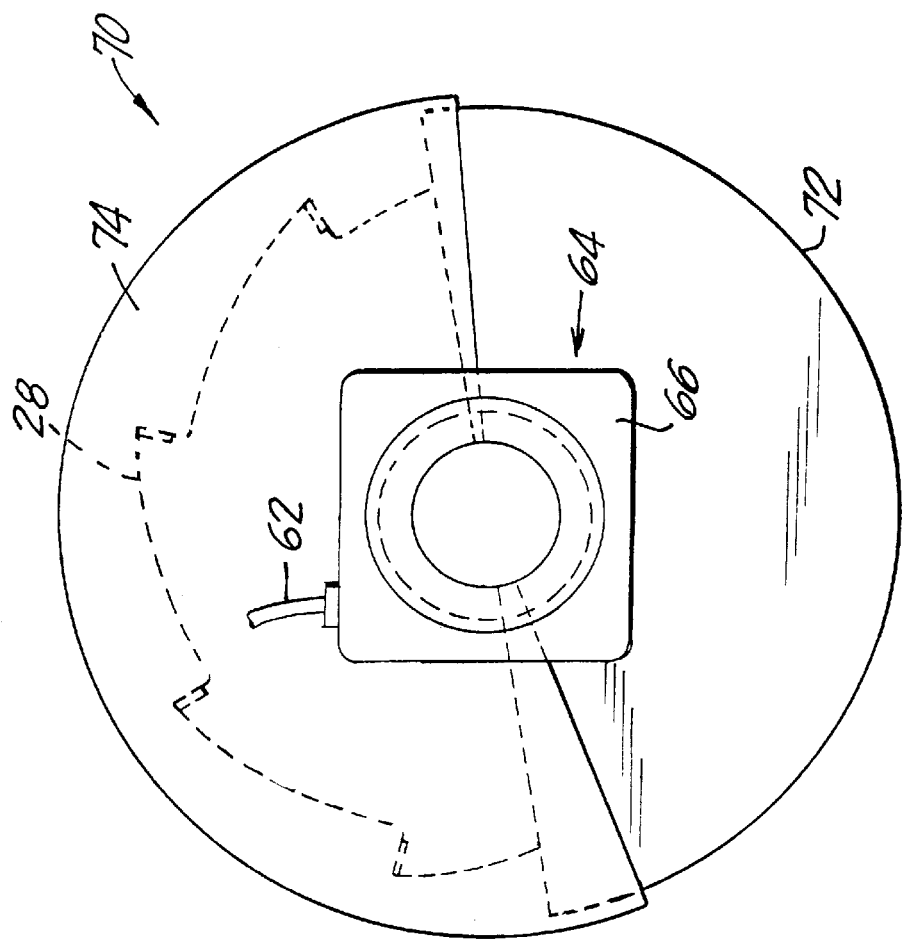
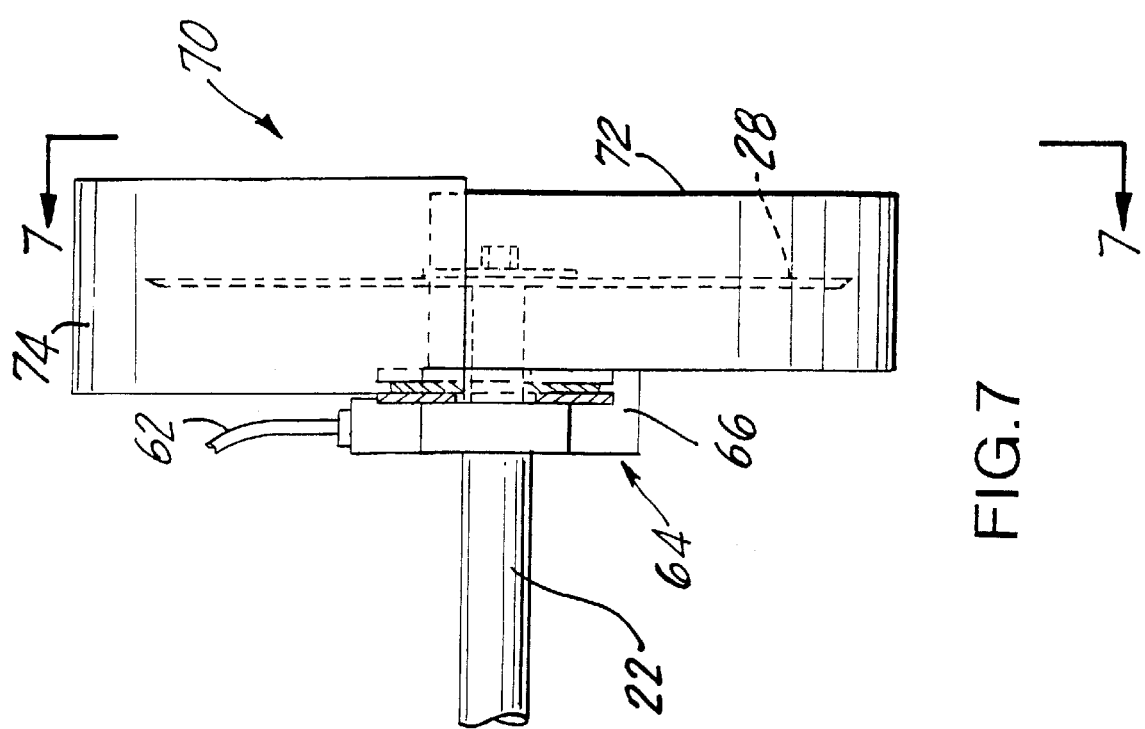

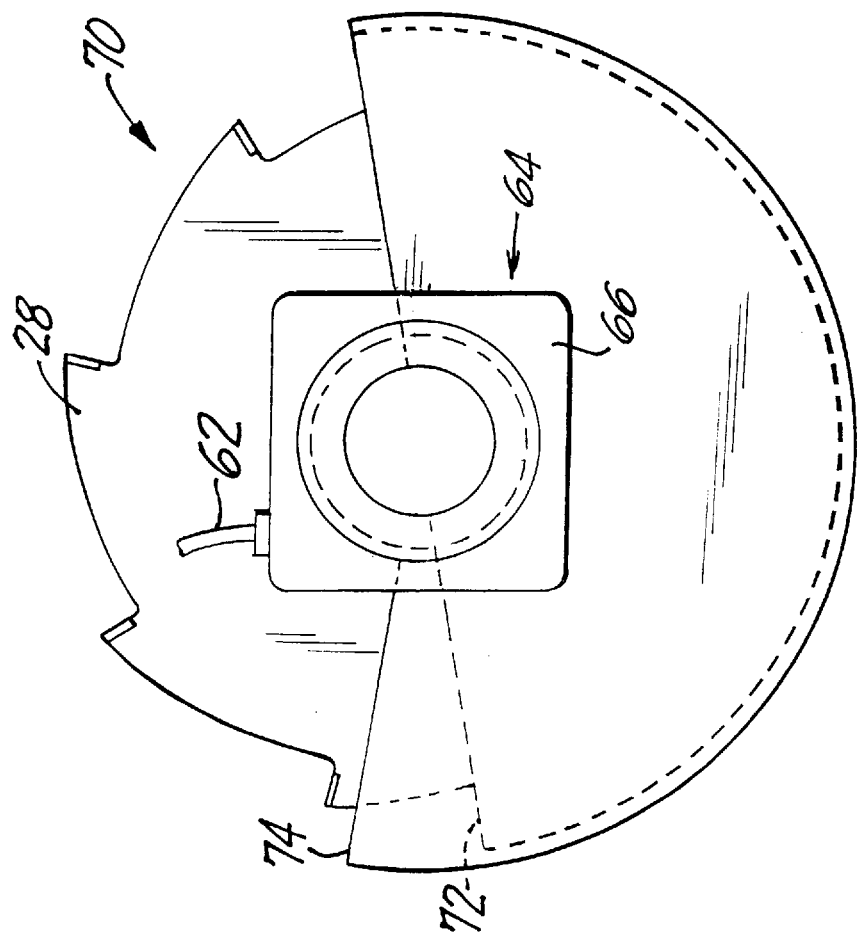
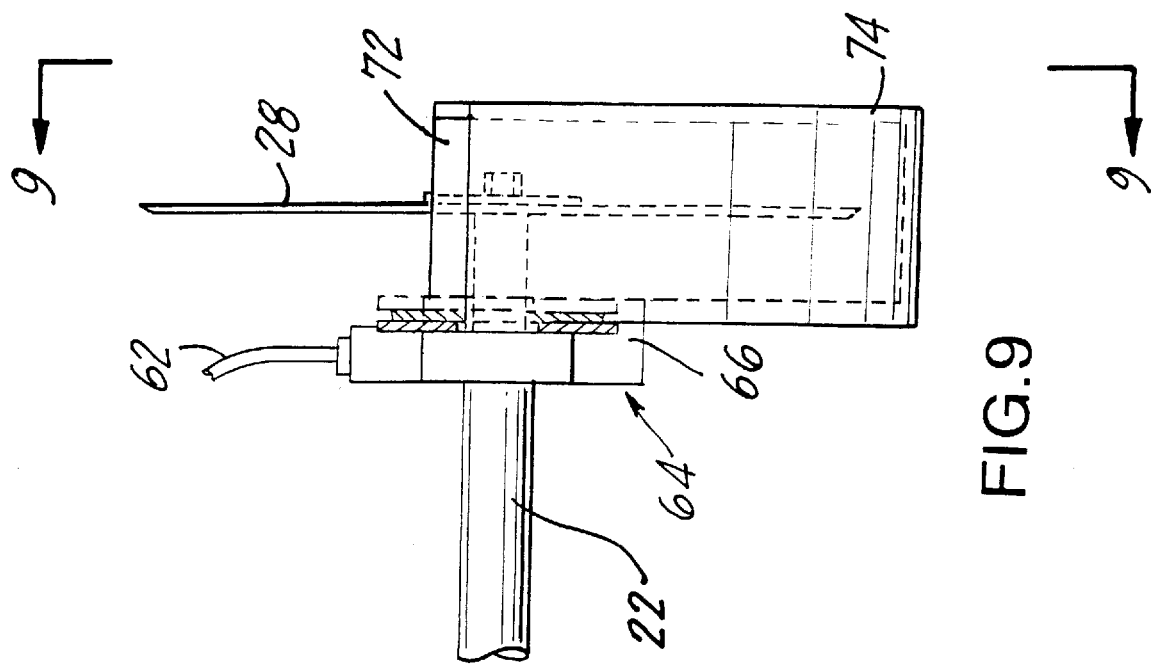
FIG.10
FIG.9

HAND-HELD MOTOR OR ENGINE POWERED RIGID BLADE BRUSH CUTTING DEVICE HAVING FAIL-SAFE DESIGN

FIELD OF THE INVENTION

The present invention relates generally to cutting devices or "trimmers" having a pole-mounted rigid rotatable cutting member and more particularly to a fail-safe design for such a brush cutting device.

BACKGROUND OF THE INVENTION

Hand-held pole-mounted engine or motor powered brush cutting devices are well known. Pole-mounted powered brush cutters can be generally classified into one of two types. One type, the string-type, has a hub driven by a motor or gasoline engine. The hub has a spool of nylon or similar string attached to it so that as the hub rotates, the string will rotate and stretch out by centrifugal force and thereby cut off light vegetation. String-type trimmers are generally used for trimming light brush, such as grass, weeds and small leaves of bushes.

Another type of pole-mounted rotating cutting member device classification is the rigid blade brush cutting device. In these devices, instead of a rotating string, a rigid rotating blade, frequently resembling a circular saw blade, is mounted on the hub at the end of the pole. These rigid blade pole-mounted cutting devices are generally used for clearing or trimming heavier brush, such as heavy vegetation and even small trees, but are often used to remove smaller brush, weeds, grass, etc., in place of the string-type trimmers.

Typically, both string and rigid blade type pole-mounted cutting devices have no enclosure for the rotating cutting member. While the absence of an enclosure for the rotating cutting member is not a serious safety problem for string type brush cutters, because personal injury is normally limited to minor cuts and abrasions in case of accidental contact with the rotating string, a rigid blade cutting device can cause severe injury or even death if the rotating blade comes in contact with a person.

In rigid blade type trimmers, the rotating rigid blade can frequently jam against wood or stones near the ground and cause it to "kick back" toward the user. This poses the risk of very serious injury, or even death. Despite this risk, conventional rigid blade trimmers employ only partial blade coverage by a fixed debris shield. Notwithstanding the risk of injury, it has apparently not been regarded by the art as necessary to provide means for positively preventing injury from the rotating blade, possibly because it was regarded that the position of the cutting device, mounted away from the body of a user at the end of a pole, was sufficient, or that the addition of safety devices would add excessive weight to the device. It is believed by the present inventors, however, that the positioning of the blade is not sufficient from the standpoint of safety, and that there is a need for a pole-mounted rigid blade trimmer having positive means for ensuring safety.

OBJECTS OF THE INVENTION

Accordingly it is an object of the present invention to provide a pole-mounted brush cutting device which has a fail-safe design which minimizes risk of injury to the user.

In particular, it is an object of the present invention to provide a hand-held powered brush cutting device which has means for rapidly stopping the rotation of the rotating blade in the event an actuating device is moved or released, before the user would be likely to be injured by the rotating blade.

It is a further object of the present invention to provide a pole-mounted brush trimmer having a fixed guard which encloses a substantial portion of the rotating blade so as to provide protection to the user but which also provides for the partial exposure of the rotating blade so as to allow for the proper utilization of the trimmer.

It is an additional object of the present invention to provide a pole-mounted brush trimmer having an articulating guard which can be selectively opened or closed to either expose or enclose the rotating blade and which will immediately close at an appropriate time, for example, as when the trimmer is turned off or set to idle, or when the trimmer is dislodged from the hands of the user.

SUMMARY OF THE INVENTION

In accordance with a preferred embodiment of the present invention, a hand-held, motor or engine powered brush cutting device is provided comprising an elongated member, a rigid rotatable cutting member rotatably mounted at a distal end of the elongated member to rotate about an axis generally in line with the elongated member, driving means for rotatably driving the cutting member, a selectively operable brake for quickly stopping the rotation of the rotatable cutting member, the brake including a rotatable member and a friction member, the friction member having an engaged position wherein the friction member is frictionally engaged to the rotatable member to stop its rotation and a released position wherein the friction member is disengaged and the rotatable member is substantially free to rotate, resilient means coupled to the friction member to resiliently urge the friction member into its engaged position, lever means coupled to the elongated member (e.g., on the member itself or a handle or a device attached to the member) operable in a first position and a second position, the lever means being operatively coupled to the friction member so that manual movement of the lever means from the first position to the second position causes the friction member to move to its released position against the urging of the resilient means, and movement, either automatic or manual, of the lever means from the second position to the first position causes the resilient means to urge the friction member to its engaged position.

As one aspect of the present invention, the lever means is urged toward its first position so that release by a user of the lever means causes the lever means to move automatically to its first position.

As another aspect of the present invention, the lever means of the foregoing brush cutting device is operatively coupled to the friction member by means of a cable, or other appropriate device, such as by solid linkage.

As a further aspect of the present invention, the rotating member has a cylindrical shape.

As a feature of this aspect, the friction member engages with the outer periphery, or, alternatively, the inner periphery, of the rotating member.

As another feature of this aspect, the friction member may be a brake band, shoe, pad, or other suitable device.

As a feature of this feature, the brake band wraps more than 180 degrees around the drum.

As yet another aspect of the present invention, the brake is automatically engaged when the driving means is controlled to not rotatably drive the rotating cutting member (i.e., when the driving means is turned off, released, set to idle, etc.).

As a feature of this aspect, the brake is automatically disengaged when the driving means is controlled to rotatably drive the rotating cutting member (e.g., when the driving means is turned on).

As yet a further aspect of the present invention, the lever means further is operable, in its second position, to control the driving means to rotatably drive the cutting member, and is operable, in its first position, to control the driving means to not rotatably drive the cutting member.

As still another aspect of the present invention, the brush cutting device includes a generally semicircular-shaped fixed guard that extends more than half-way around (e.g., 200°) the cutting member for substantially enclosing the rotatable cutting member.

As still yet a further aspect of the present invention, the brush cutting device further comprises means for selectively substantially fully enclosing the rotatable cutting member comprising a generally semicircular fixed guard extending approximately half way around the cutting member, a generally semicircular articulating guard which is pivotable about an axis generally coaxial with the axis of rotation of the rotatable cutting member from a closed position whereby the portion of the rotatable cutting member not enclosed by the fixed guard is covered, to an open position whereby the portion of the rotatable cutting member not enclosed by the fixed guard is uncovered, resilient means coupled to the articulating guard to resiliently urge the articulating guard into its closed position.

As a feature of this aspect, the lever means is further operatively coupled to the articulating guard so that manual movement of the lever means from the first position (e.g., an extended position) to the second position (e.g., a retracted position) causes the articulating guard to move to its open position against the urging of the resilient means, and whereby movement, either automatic or manual, (e.g., release) of the lever means from the second position to the first position causes the resilient means to urge the articulating guard to its closed position.

As another feature of this aspect, the articulating guard substantially surrounds the fixed guard in the open position, e.g., when the device is engaged.

As a further feature of this aspect, the lever means is further operatively coupled to both the articulating guard and the driving means, so that manual movement of the lever means from its first position to its second position causes the articulating guard to move to its open position and controls the driving means to rotatably drive the cutting member, and movement of the lever means from its second position to its first position causes the resilient means to urge the articulating guard to its closed position and controls the driving means to not rotatably drive the cutting member.

In another preferred embodiment of the present invention, a hand-held, motor or engine powered brush cutting device is provided comprising an elongated member, a rigid rotatable cutting member rotatably mounted at a distal end of the elongated member to rotate about an axis generally in line with the elongated member, driving means for rotatably driving the cutting member, means for selectively substantially fully enclosing the rotatable cutting member comprising a generally semicircular fixed guard extending approximately half way around the cutting member, a generally semicircular articulating guard which is pivotable about an axis generally coaxial with the axis of rotation of the rotatable cutting member from a closed position whereby the portion of the rotatable cutting member not enclosed by the fixed guard is covered to an open position whereby the portion of the rotatable cutting member not enclosed by the fixed guard is not covered, resilient means coupled to the articulating guard to resiliently urge the articulating guard into its closed position, lever means operatively coupled to the articulating guard having first and second positions so that manual movement of the lever means from the first (e.g., extended) position to the second (e.g., retracted) position causes the articulating guard to move to its open position against the urging of the resilient means, and movement, either automatic or manual, of the lever means from the second position to the first position causes the resilient means to urge the articulating guard to its closed position.

As an aspect of this embodiment of the present invention, the lever means includes means for urging the lever means to the first position, whereby release of the lever means automatically causes the lever means to move to its first position.

As another aspect of this embodiment, the articulating guard substantially surrounds the fixed guard in the open position.

As a further aspect of this embodiment, the lever means further is operable, in the second position, to control the driving means to rotatably drive the cutting member, and is operable, in the first position, to control the driving means to not rotatably drive the cutting member.

BRIEF DESCRIPTION OF THE DRAWINGS

These and other objects, features and advantages of the present invention will be apparent to those skilled in the art in view of the following description and drawings, wherein:

FIG. 2 is an elevation view of the blade braking assembly for automatically bringing the rotating cutting member quickly to a stop;

FIG. 3 is a section view taken along the line 2—2 of FIG. 2 of the blade braking assembly in accordance with the present invention;

FIG. 7 is a side view, partly in phantom, of the rotating cutting member end of a pole-mounted brush cutting device in accordance with the present invention, showing the articulating guard for the rotating blade in the closed position;

FIG. 8 is an end view, partly in phantom, of the articulating guard for the rotating cutting member end of the pole-mounted brush cutting device, taken along the line 7—7 of FIG. 7, with the articulating guard in the closed position;

FIG. 9 is a side view, partly in phantom, of the rotating cutting member end of a pole-mounted brush cutting device in accordance with the present invention, showing the articulating guard in the open position;

FIG. 10 is an end view, partly in phantom, of the articulating guard for the rotating cutting member end of the pole-mounted brush cutting device, taken along the line 9—9 of FIG. 9, with the articulating guard in the open position;

DETAILED DESCRIPTION OF CERTAIN PREFERRED EMBODIMENTS

Figure 1:
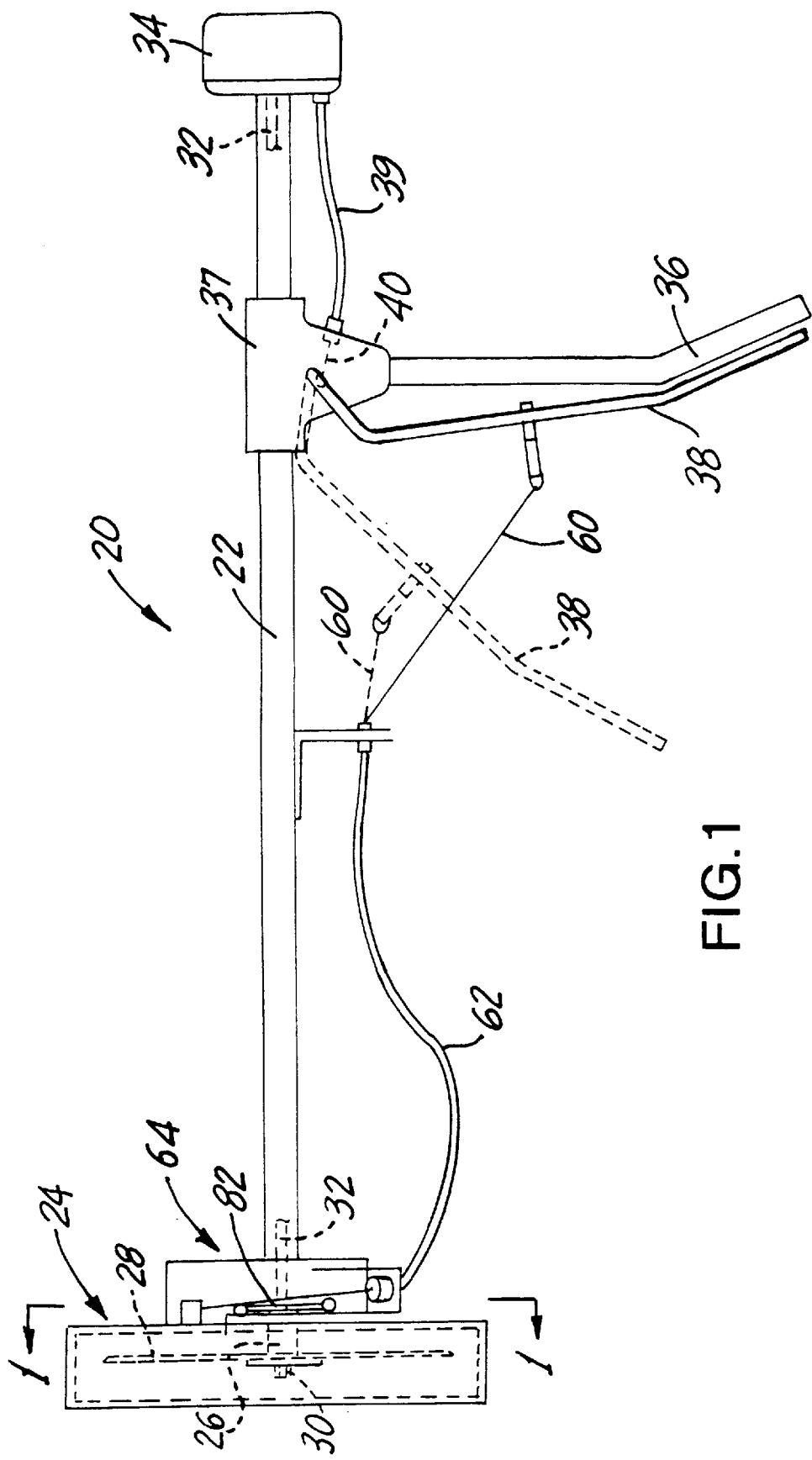
FIG. 1 is a side view, partly in section, of a pole-mounted brush cutting device in accordance with the present invention.

Turning now to the drawings in detail and initially to FIG. 1 thereof, a pole-mounted brush cutting device or trimmer 20 is depicted. Trimmer 20 includes an elongated pole or member 22 which is preferably a round tubular member enclosure for the drive shaft. At the distal end of pole 22, to the left of FIG. 1, is mounted a rotating cutting member assembly 24. Cutting member assembly 24 is comprised of a hub 26 to which is mounted a rigid rotating cutting member or rotating blade 28 by means of attachment bolt 30 or nut or other suitable attachment device.

Hub 26 is mounted by conventional bearings (not shown) to the end of the elongated pole 22 such that it is free to rotate. Hub 26 is, in turn, driven by means of a drive shaft 32, shown in phantom in FIG. 1, which extends through the elongated pole 22 to a motor or engine (not shown). As is well known, a gasoline engine may be utilized, although an electric or air driven motor can be used to the same effect. Also, as will be understood, the motor or engine generally is located at the rearward end of elongated pole 22, to the right of FIG. 1, wherein a blade braking device 34 (to be discussed) either is included within the assembly of the motor or engine or, alternatively, located at any position along pole 22 between the motor or engine and hub 26. As described herein, blade braking device is located at the right end of pole 22, as shown in FIG. 1.

It should be noted that, although trimmer 20 is depicted with the pole 22 horizontal, in actual use, the pole will usually be extended generally downwardly, with the cutting member near the user's feet.

As is well known, when the throttle to the engine is closed (or as the motor is turned off, as appropriate), the inertia of the rotating parts of the motor or engine and the rotating blade 28 tends to keep these parts rotating for a substantial period of time. If the rotating blade 28 has struck a rock or other hard object, and then has kicked back, the continued rotation of the rotating cutting blade could create a dangerous situation. Therefore, in accordance with the present invention, means are provided for positively preventing the rotating blade 28 from seriously harming the user by providing a blade braking device which quickly stops the rotation of the blade in the event of a mishap. In addition, means are provided for preventing the rotating blade 28 from unintentionally striking the user, as will be discussed further below.

In accordance with the present invention, a handle 36 is transversely mounted to the pole 22 between the cutting member assembly 24 and the blade braking device 34 (also, the motor or engine) by means of a handle bracket 37. The transverse handle 36 is usually spaced somewhat closer to the motor or engine in order to provide proper balance between the weight of the motor or engine and the cutting member assembly 24 and for convenience in operation of the trimmer. A brake cable sheath 39 which includes a brake control cable 40 therein is attached to the handle bracket 37 and the brake control cable 40 is operatively connected to a hand lever 38 that is pivotally mounted to the handle bracket 37. Hand lever 38 extends to substantially the end of the transverse handle so that it may be operated by a user while his or her hands are holding the transverse handle. The hand lever 38 may represent a different control lever (or switch) that controls the motor or engine or, alternatively, may be the same hand lever that controls the motor or engine (to be further discussed).

Brake control cable 40, within sheath 39, extends to blade braking device 34 and, as will be understood, operatively controls the blade brake of the present invention. As depicted in FIG. 1, blade braking device 34 is preferably located along pole 22 opposite the cutting member assembly and may be included within, on or near the motor or engine. In an alternative embodiment of the present invention, blade braking device 34 is located at the distal end of pole 22, near the cutting member assembly 24.

Blade braking device 34 is shown in detail in FIGS. 2 and 3, and is comprised of a rotatable drum 42, a brake band 48, a brake band anchor 49, a brake control linkage 52, a brake actuating spring 56, and a brake house 44. The rotatable drum 42 is operatively connected to drive shaft 32 so that it rotates therewith. The brake band 48 preferably is covered with a wear-resistant friction surface and is attached to a brake band anchor 49 by means of a mounting bolt 50 or other appropriate device. Brake band anchor 49 is fixedly connected to the brake housing 44.

Brake band 48 extends circumferentially around the rotating drum 42 to the free end of the brake control linkage 52, which is pivotally mounted to the brake housing 44 by means of a pivot pin 54. Brake band 48 preferably curves more than 180° around the circumference of the rotating drum 42 in order to apply a strong self-energizing frictional force to the rotating drum when the braking device is energized.

Figure 11:
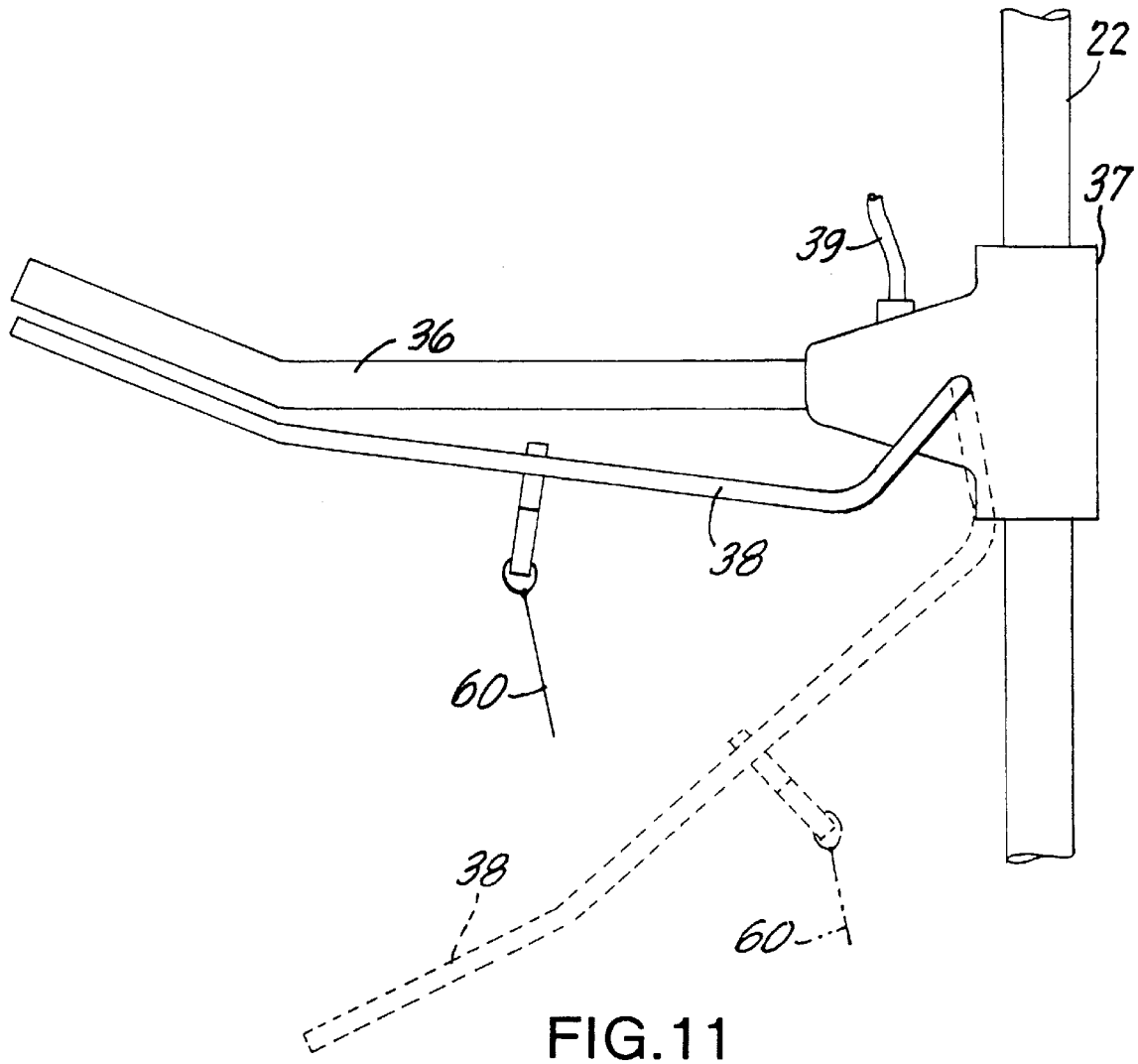
FIG. 11 is a detailed side view of the transverse handle and movable lever for the pole-mounted brush cutting device, showing the retracted position of the lever in solid lines and the extended position in dotted lines.
Figure 12:
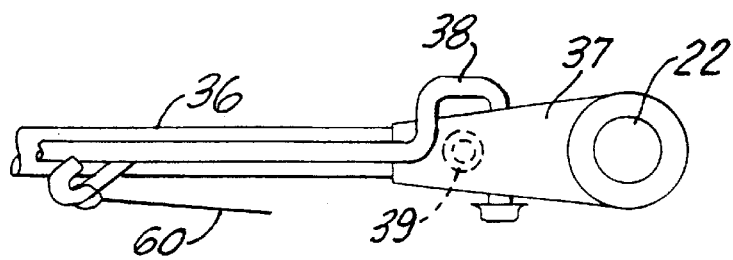
FIG. 12 is a view of a portion of the transverse handle and movable lever depicted in FIG. 11, taken along the line 11—11 of FIG. 11.

Brake control linkage 52 is resiliently urged toward a frictionally engaged (i.e., energized) position by means of brake actuating spring 56 which is mounted between an attachment hook 57 of the housing and a spring attachment eye 58 on the brake control linkage 52. Alternatively, the spring may be arranged to push brake band 48 or to push the brake control linkage 52 into contact with drum 42. The engagement of the brake band 48 (or the linkage 52) with the rotating drum is controlled by means of the brake control cable 40 which extends through cable sheath 39 toward hand lever 38. When hand lever 38 is in the retracted position adjacent the handle 36, as depicted by the solid lines in FIG. 1 (also shown in FIGS. 11 and 12), brake control cable 40 is taut and pulls brake control linkage 52 against the force of brake actuating spring 56, thus pulling the brake band 48 away from rotating drum 42 to permit its free rotation. As long as lever 38 is held toward handle 36, the brake band 48 will remain in this frictionally disengaged position. In an alternative embodiment of the present invention, this retracted position of lever 38 also provides for the opening of the throttle of the engine or for the increasing of the motor speed.

When lever 38 is released, as indicated by the broken lines in FIG. 1 (and FIG. 12), either intentionally to slow or stop the motor or engine (in one alternative embodiment), or unintentionally due to kick back of the rotating blade or other mishap, brake control cable 40 becomes loose, thus permitting brake actuating spring 56 to resiliently urge the brake control linkage 52, and hence the brake band 48, into the frictionally engaged position on the rotating drum 42. This quickly stops the rotation of the rotating blade 28 before serious injury can result from the rotating blade.

It will be appreciated that, due to the self-actuating nature of the brake band on the rotating drum, and the fact that the brake actuating spring 56 tends to resiliently urge the brake into the engaged position, rather than the disengaged position as with conventional brake systems. Thus, the blade braking device is fail-safe in the sense that if the control lever 38 is dislodged from the hands of the user, the blade rotation will be quickly stopped. The blade braking device is also fail-safe in the sense that failure or breaking of the cable 40 will tend to cause the brake band to engage with the rotating drum to stop the rotation of the blade, thus further insuring safety.

Figure 5:
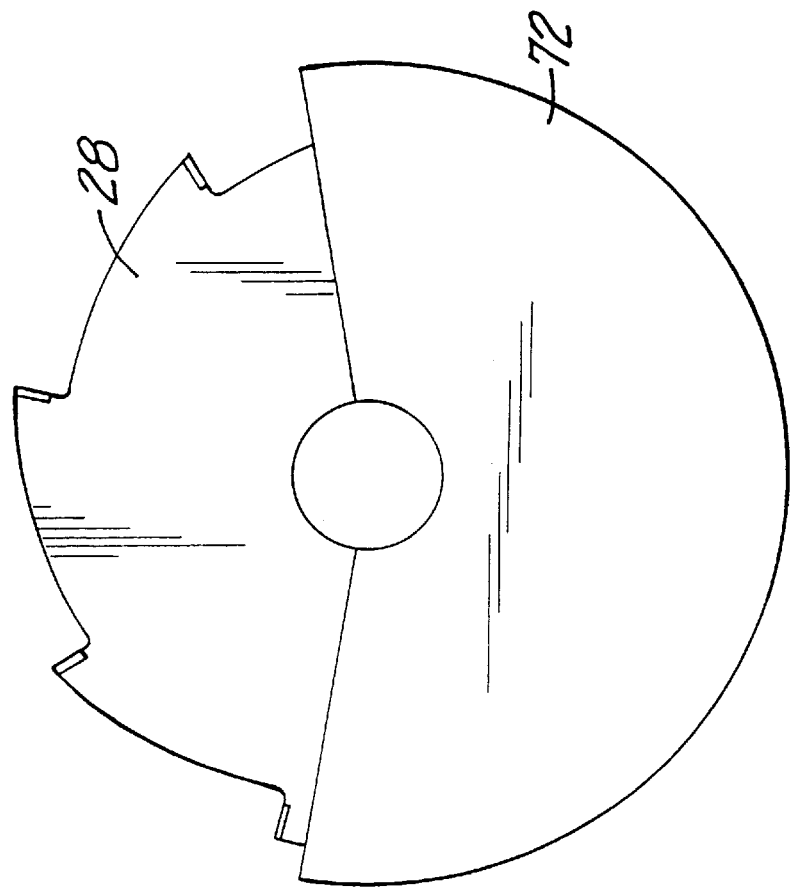
FIG. 5 is an end view of the rotating cutting member end of the pole-mounted brush cutting device having a fixed guard, taken along the line 4—4 of FIG. 4.
Figure 4:
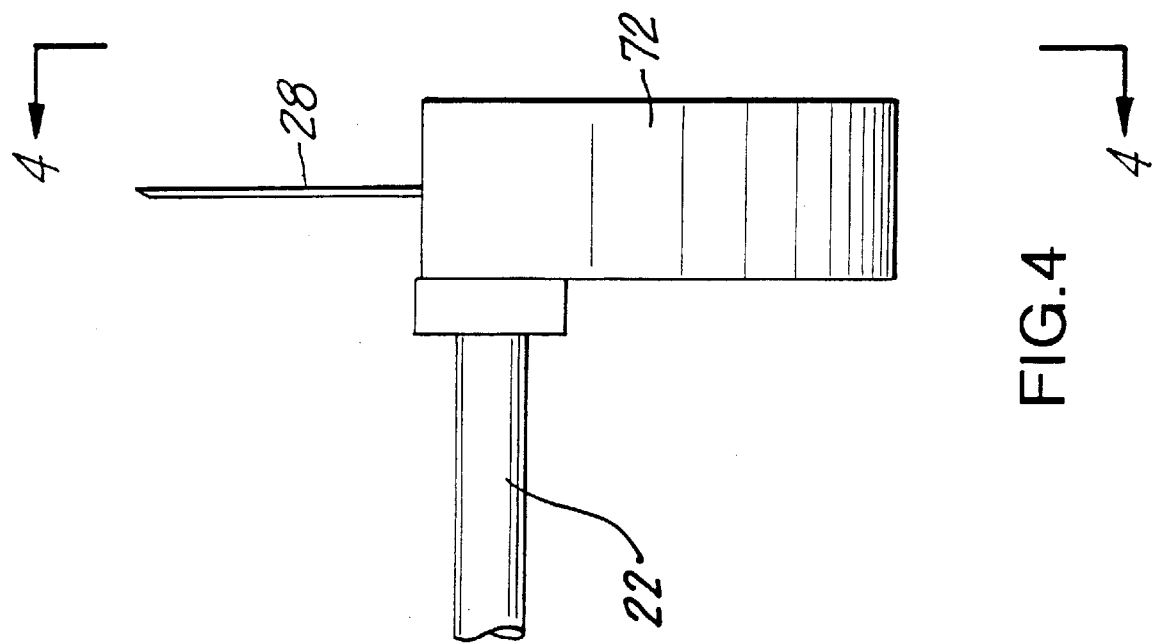
FIG. 4 is a side view of the rotating cutting member end of the pole-mounted brush cutting device in accordance with another embodiment of the present invention, having an exposed rigid cutting blade and a fixed guard.

In accordance with another embodiment of the present invention, trimmer 20 is provided with a fixed guard which encloses the cutting edge of rotating blade 28 except at the point of operation. A rotating cutting member assembly of trimmer 20 having a fixed guard is shown in FIGS. 4 and 5. Fixed guard 72 encloses at least the rear half (i.e., the side that faces the user) of rotating blade 28 and extends forward therefrom by at least 10° on each side, thus providing an enclosure angle of at least 200°. The trimmer 20 may be comprised of a fixed guard alone, or a fixed guard in combination with the above-described blade braking device.

Figure 6:
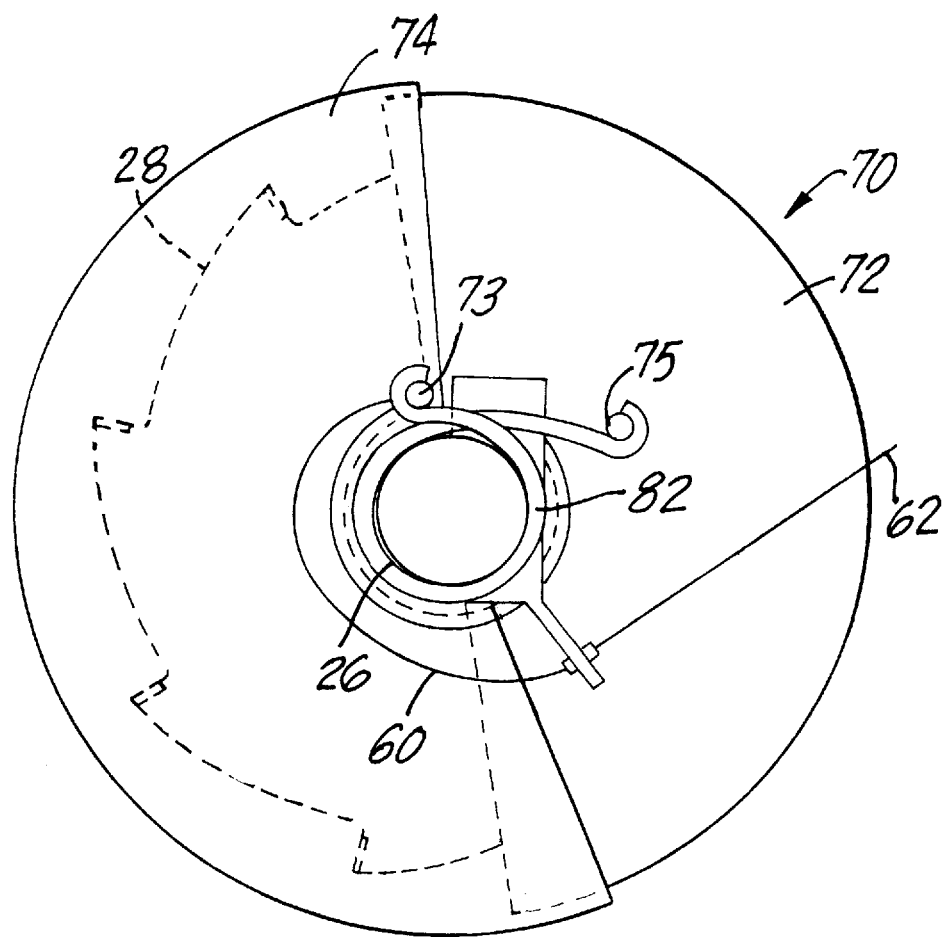
FIG. 6 is an end view, partly in phantom, of an articulating guard assembly for the rotating cutting member in accordance with a further embodiment of the present invention.

In accordance with a further embodiment of the present invention, the rotating cutting member assembly 24 of trimmer 20 is provided with an articulating guard assembly 70, which will be described with reference to FIGS. 6–10. As depicted in FIG. 6, the articulating guard assembly 70 consists of a fixed guard member 72 which extends approximately 180° around the rotating blade 28 to partially enclose it. The articulating guard assembly 70 also includes an articulating guard member 74 which is pivotally mounted on the distal end of elongated pole 22, as shown in FIGS. 7 and 9.

Articulating guard member 74 is similar in shape to the fixed guard member 72, but preferably slightly larger in diameter so that it can pivot around the axis of the elongated pole 22 to go around fixed guard 72. In this way, the articulating guard member 74 can be opened to expose the rotating blade 28 and can pivot back around the opposite direction to fully enclose the rotating blade 28. The articulating guard member in the fully closed position is depicted in FIGS. 6, 7 and 8. The open position of the articulating guard member is depicted in FIGS. 9 and 10. Although the preferred articulating guard member 74 is slightly larger in diameter than the fixed guard member, this arrangement can be reversed so that the fixed guard member is slightly larger in diameter than the articulating guard member.

In order to fully enclose the rotating blade, the articulating guard 74 preferably extends somewhat more than 180° around the circumference of the rotating blade so that the articulating guard and fixed guard together fully enclose the blade when the articulating guard is in the closed position.

The articulating guard member 74 is selectively operable by means of an articulating guard control cable 60. Control cable 60 is attached to hand lever 38, as shown in FIG. 1, and extends through a cable sheath 62 to articulating guard spring assembly 64. Optionally, the cable sheath 62 may be supported to pole 22. Articulating guard spring assembly 64, which is shown in FIGS. 1 and 7–10 includes a spring housing 66 which houses a spring assembly which operates to open and close the articulating guard member 74. Control cable 60 is attached to articulating guard member 74 at a convenient location in any convenient manner.

As depicted in FIG. 6, the spring assembly in spring housing 66 is comprised of a return spring 82 which is disposed between an attachment lug 73 on articulating guard member 74 and an attachment lug 75 on fixed guard member 72. Return spring 82 urges articulating guard member 74 into the fully enclosed position.

Although FIG. 1 illustrates separate cables 40 and 60 for actuating the blade braking device and the articulating guard of the present invention, it may be possible to utilize the same actuating cable (e.g., cable 60) for both the blade brake and the articulating guard. For example, cable 60 may be utilized to actuate both safety devices if the blade braking device 34 is positioned near the distal end of pole 22 by the articulating guard spring assembly 64. However, in either case, both the blade braking device and the articulating guard operate together to fully ensure safety to a user. Of course, either of these devices may be used alone or together, as described, or in successive combination such that the engagement of one device causes the successive engagement of the other device (with or without a delay therebetween).

Referring again to FIG. 1, when lever 38 is pulled back toward handle 36 and adjacent thereto, actuating cable 60 pulls the articulating guard 74 open against the force of return spring 82, exposing the blade. In the preferred embodiment of the present invention, this action simultaneously releases brake band 48 by means of cable 40. Also, as previously mentioned, this operation in one embodiment also operates to open the throttle to the engine (or increase motor control on the motor) thus driving the rotating blade 28 for use in cutting brush or other vegetation.

When lever 38 is released, either intentionally or through mishap, articulating guard 74 closes, by means of the urging of return spring 82, into the fully enclosing position depicted in FIG. 6. This is accomplished at substantially the same time as the throttle or motor control is turned off, or set to idle, and at the same time the braking device is energized, stopping the blade. A failure of the actuating cable 60 causes the articulating guard 74 to close, thus fully enclosing the rotating blade in a safe condition and thus, like the blade braking device, articulating guard assembly is also fail-safe. And where both the braking device and articulating guard are employed, a mechanical failure of either will not prevent the safe operation of the other, thus further ensuring a fail-safe design.

It will be understood that the above description is exemplary of that which falls within the scope of the appended claims and that various modifications may be made without departing from the scope and spirit of the present invention.

What is claimed is:

1. A hand-held, powered brush cutting device, comprising:
   an elongated member;
   a rigid rotatable cutting member rotatably mounted at a distal end of said elongated member to rotate about an axis generally in line with said elongated member;
   driving means for rotatably driving said cutting member;
   a selectively operable brake for quickly stopping the rotation of said rotatable cutting member, said brake including a rotatable member and a friction member, said friction member having an engaged position wherein said friction member is frictionally engaged to said rotatable member to stop its rotation and a released position wherein said friction member is disengaged from the rotatable member to allow it to freely rotate;
   resilient means coupled to said friction member to resiliently urge said friction member into its engaged position;

lever means coupled to said elongated member and having a first position and a second position, said lever means being operatively coupled to said friction member so that manual movement of said lever means from said first position to said second position causes said friction member to move to its released position against the urging of said resilient means, and whereby movement of said lever means from said second position to said first position causes said resilient means to urge said friction member to its engaged position, means for selectively substantially fully enclosing said rotatable cutting member comprising a generally semicircular fixed guard extending approximately half way around said cutting member, a generally semicircular articulating guard being pivotable about an axis generally coaxial with the axis of rotation of said rotatable cutting member from a closed position, whereby the portion of said rotatable cutting member not enclosed by said fixed guard is covered, to an open position whereby the portion of said rotatable cutting member not enclosed by said fixed guard is not covered; and second resilient means coupled to said articulating guard to resiliently urge said articulating guard into its closed position.

2. The device defined in claim 1, wherein said lever means includes means for urging said lever means to said first position, whereby release of said lever means automatically causes said lever means to move to its first position.

3. The device defined in claim 1, wherein said lever means is operatively coupled to said friction member by means of a cable.

4. The device defined in claim 1, wherein said rotatable member has a cylindrical shape.

5. The device defined in claim 4, wherein said friction member engages with the outer periphery of said rotatable member.

6. The device defined in claim 5, wherein said friction member is a brake band.

7. The device defined in claim 6, wherein said brake band wraps more than 180 degrees around the outer periphery of said rotatable member.

8. The device defined in claim 1, wherein said brake is automatically engaged when said driving means is controlled to not rotatably drive said rotatable cutting member.

9. The device defined in claim 8, wherein said brake is automatically disengaged when said driving means is controlled to rotatably drive said rotatable cutting member.

10. The device defined in claim 1, wherein said lever means further is operable, in the second position, to control the driving means to rotatably drive said cutting member, and is operable, in the first position, to control the driving means to not rotatably drive said cutting member.

11. The device defined in claim 1, further comprising a generally semicircular-shaped fixed guard extending more than half-way around said cutting member for substantially enclosing said rotatable cutting member.

12. The device defined in claim 11, wherein said fixed guard extends substantially 200° around said rotatable cutting member.

13. The device defined in claim 1, wherein said lever means is further operatively coupled to said articulating guard so that manual movement of said lever means from said first position to said second position causes said articulating guard to move to its open position against the urging of said resilient means, and whereby movement of said lever means from said second position to said first position causes said resilient means to urge said articulating guard to its closed position.

14. The device defined in claim 1, wherein said articulating guard substantially surrounds said fixed guard in said open position.

15. The device defined in claim 1, wherein said lever means is further operatively coupled to both said articulating guard and said driving means, wherein manual movement of said lever means from said first position to said second position causes said articulating guard to move to its open position against the urging of said resilient means and controls the driving means to rotatably drive said cutting member, and movement of said lever means from said second position to said first position causes said resilient means to urge said articulating guard to its closed position and controls the driving means to not rotatably drive said cutting member.

16. A hand-held, powered brush cutting device, comprising:

an elongated member;

a rigid rotatable cutting member rotatably mounted at a distal end of said elongated member to rotate about an axis generally in line with said elongated member;

driving means for rotatably driving said cutting member;

means for selectively substantially fully enclosing said rotatable cutting member comprising a generally semicircular fixed guard extending approximately half way around said cutting member;

a generally semicircular articulating guard pivotable about an axis generally coaxial with the axis of rotation of said rotatable cutting member from a closed position, whereby the portion of said rotatable cutting member not enclosed by said fixed guard is covered, to an open position whereby the portion of said rotatable cutting member not enclosed by said fixed guard is not covered;

resilient means coupled to said articulating guard to resiliently urge said articulating guard into its closed position; and lever means operatively coupled to said articulating guard and having a first position and a second position, wherein manual movement of said lever means from said first position to said second position causes said articulating guard to move to its open position against the urging of said resilient means, and movement of said lever means from said second position to said first position causes said resilient means to urge said articulating guard to its closed position.

17. The device defined in claim 16, wherein said lever means includes means for urging said lever means to said first position, whereby release of said lever means automatically causes said lever means to move to its first position.

18. The device defined in claim 16, wherein said articulating guard substantially surrounds said fixed guard in said open position.

19. The device defined in claim 16, wherein said lever means further is operable, in the second position, to control the driving means to rotatably drive said cutting member, and is operable, in the first position, to control the driving means to not rotatably drive said cutting member.

* * * * *